United States Patent Office 3,378,831
Patented Apr. 16, 1968

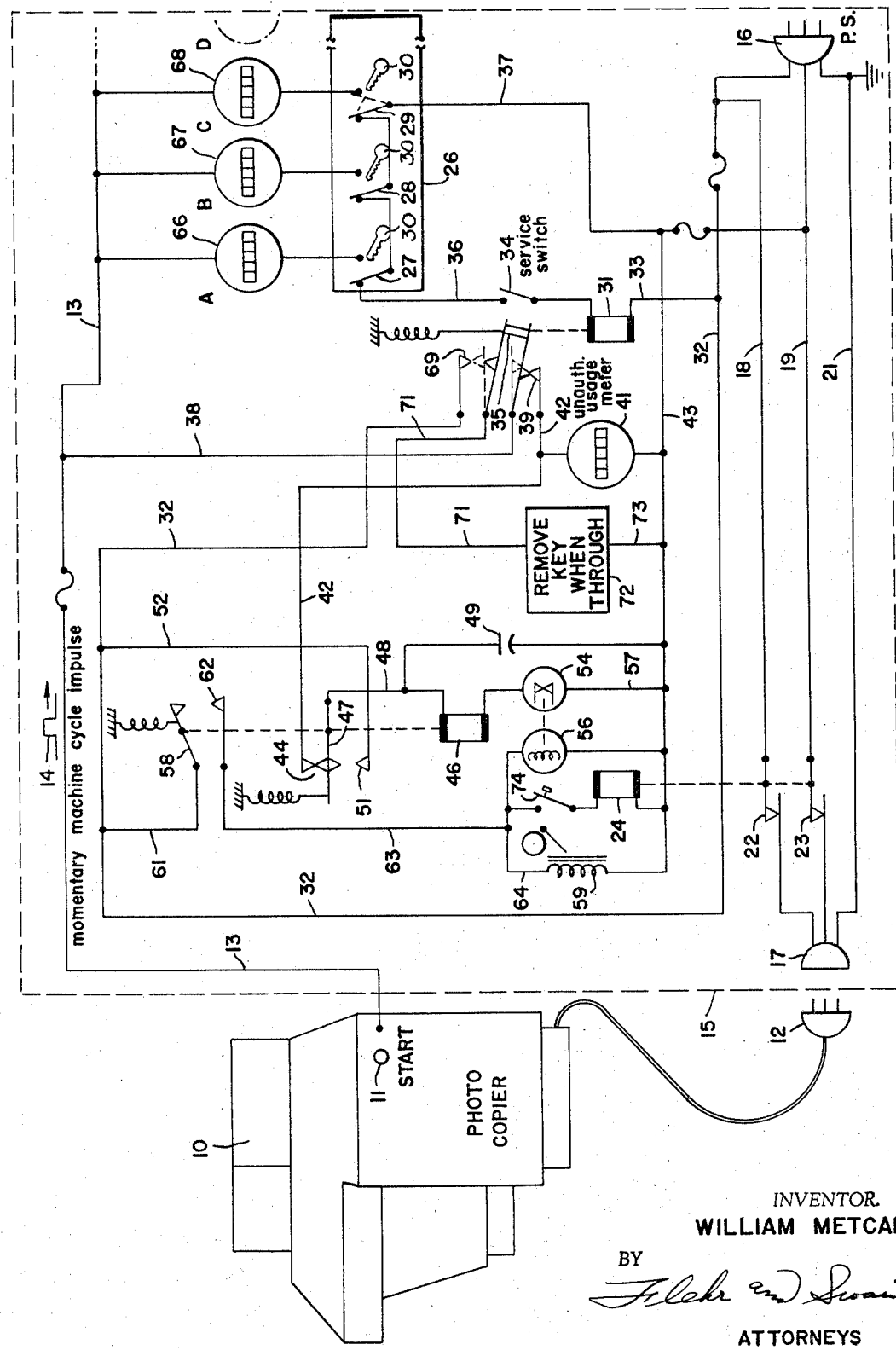

3,378,831
MACHINE USAGE ACCOUNTING SYSTEM
William Metcalf, 5400 Fulton St.,
San Francisco, Calif. 94121
Filed Aug. 11, 1965, Ser. No. 478,934
8 Claims. (Cl. 340—274)

This invention relates to an electrical control system for monitoring machine usage and is particularly useful in monitoring the usage made by a number of users of apparatus, such as photocopiers, of a type which generates a pulse indicative of each cycle of operation.

Frequently, where a machine is to be operated by a number of users it will be desirable to account for the degree of usage made by each. For photocopy apparatus, for example, a large number of people in an office or in various offices may utilize the same machine. When it is desired to accunt for their individual usage so that the cost can be shared pro-rata among the various users, it has, in the past, been a practice to maintain a ledger sheet and rely upon the various users to record the number of cycles of machine operation attributable to themselves.

The foregoing procedure has proved unsatisfactory in respect to its accuracy and accordingly it is desirable to provide a more exact accounting control over such usage.

In general, it is an object of the invention to provide a control system to account for the individual usage made of a machine subject to being operated by many users.

It is another object of the invention to provide a control system of the foregoing type as a self-contained unit wherein no modification of the existing machine which is to be controlled is required in order to install the control system.

Another object of the invention is the provision of a usage control system wherein unauthorized usage of the machine sounds an audible alarm of predetermined volume and duration sufficient to embarass the unauthorized user and thereby inhibit unauthorized usage.

Another object of the invention is the provision of a control system of the kind described above wherein each unauthorized usage of the machine is recorded whereby the amount of such unauthorized usage can be evaluated.

Yet another object of the invention is the provision of a control system for monitoring usage of a machine by many users wherein unauthorized usage of the machine serves to sound an audible alarm and at the same time serves to deactivate the machine being used.

These and other objects of the invention will be more readily apparent from the following detailed description of a preferred embodiment of the invention as shown in the single figure of the drawing.

In general, the accounting control system described herein is adapted to record the individual usage by a number of users of utilization means of a type generating a pulse for each cycle of operation thereof to be recorded. The system entails a panel or bank of lockable switches, each of which is movable between locked and unlocked states by an associated key unique to each particular switch. Each switch controls an associated counting register whereby when the key is inserted and the switch unlocked, the register will record the usage of the key holder. When no switch is unlocked, another register serves to count each cycle of machine operation whereby a tally of unauthorized usage of the machine being monitored can be obtained.

With reference to the drawing, the usage accounting control system is adapted to record the individual usage by plural operators of a machine or other utilization means of a type which generates a pulse for each cycle of operation thereof. As shown in the drawing, a photocopier 10 has been illustrated which includes a start button 11 and a power connector plug 12 of a type adapted to cooperate with a utility outlet receptacle. A conductor 13 is connected to any suitable part of the machine 10 whereby a momentary machine cycle impulse 14 will be sensed for each cycle of operation of machine 10.

The accounting system is arranged as a self contained unit within an enclosure represented by line 15 and includes a power plug 16 adapted to be plugged into a suitable utility receptacle power source. Another power plug 17 is adapted to receive plug 12 of machine 10. It will be readily apparent that when plugs 12 and 17 have been connected, plug 16 coupled to a suitable power source will supply power to the photocopier 10 via leads 18, 19, and 21. Leads 18, 19 include power interruptor contacts 22, 23 operated from an interruptor relay 24 the function of which will be later described further below.

A switchboard panel 26 comprises a bank of switches 27, 28, 29 each of which is movable between locked and unlocked states by keys 30, unique to each. Switches 27-29 are connected in series whereby operation of any of switches 27-29 serves to disable the alarm circuit by disabling heavy duty alarm relay 31. Thus, relay 31 is normally energized unless a key holder identified as A, B, C, D, etc., employs his key to open the circuit traced from plug 16 via lines 32, conductor 33, relay 31, service switch 34 (normally closed), lead 36, and thence through the series connected switches 27-29 to lead 37 which returns to the common line 19.

Photocopier machine 10 can be started by depressing a start button 11 whereby machine cycle pulse 14 appears on conductor 13 and is fed via line 38 to alarm contacts 39, then in their closed position due to the action of relay 31. The pulse on line 38 therefore serves to advance an unauthorized usage register or meter 41 in the form of a counting register of a type to be advanced one increment for each pulse sensed. Meter 41 is connected between leads 42, 43, and thence to conductor 37 which connects to common lead 19.

Each of switches 27-29 is operatively coupled to an associated storage register 66, 67, 68, etc., respectively for recording the individual usage of the various operators A, B, C, etc., as will be explained further below.

The pulse which serves to advance the unauthorized usage meter 41 also travels along conductor 42 to a pair of normally closed contact points 44 which serve to momentarily energize an alarm relay 46 whereby an audible alarm is sounded for a predetermined duration. Relay 46 is "picked" by means of a pulse on lead 42 acting through contact points 44, the armature 47 of relay 46, and conductor 48 so as to charge condenser 49 to a predetermined level. At the same time as condenser 49 is being charged relay 46 is becoming energized sufficiently whereby armature 47 will be transferred to the holding point 51. As soon as armature 47 breaks contact with point 44, it will be apparent that relay 46 will be immediately de-energized. However, condenser 49 immediately discharges through relay 46 whereby continued operation is momentarily assured. As soon as the contact points of armature 47 make contact with point 51, a holding circuit is established, traced as follows.

Conductor 32 carries power from plug 16 to lead 52 and then via hold point 51 to armature 47 and relay 46. From relay 46 the circuit is completed through a lead which includes the normally closed contact points 54 of a thermally responsive time delay switch 56 and thence to common lead 19 via leads 57, 43, and 37.

When alarm relay 46 is energized, an alarm is activated and held in its energized state for a predetermined period. Thus, a second armature 58 is provided for relay 46 whereby a circuit is completed which preferably sounds an audible alarm 59 such as a bell, horn, or buzzer. Accordingly, power lead 32 is tapped by line 61 which leads to armature 58 normally held open by a spring. When closed, circuit is traced through contact point 62 (now closed by means of relay 46) and thence via leads 63, 64, alarm 59, conductor 43, and then to common lead 19 via lead 37.

Operation of the accounting control system to this point proceeds as follows to demonstrate unauthorized usage of machine 10.

Assuming that power plug 16 is plugged into a suitable power source and that the photocopier machine 10 is also ready for operation, either by plugging connector 12 into plug 17 or into an independent power source, it will be readily apparent that an unauthorized operator who does not hold a key for controlling switches 27–29 will be able to start the photocopier by depressing start button 11. At that time, however, the heavy duty alarm relay 31 is energized via lead 33 and contact points 39 are closed.

As machine 10 generates a machine cycle impulse 14 on lead 13, the impulse 14 will be sensed through contacts 39 and fed via contact points 44 to momentarily energize relay 46 long enough to transfer armature 47 to the holding point 51. Armature 58 also transfers onto contact point 62. At that point, alarm 59 is energized in parallel with timer switch 56.

Impulse 14 also advanced the unauthorized usage meter 41 one step so as to record the unauthorized cycle of operation of the copying machine 10.

Alarm 59 continues to sound for a predetermined period until interrupted by action of the timer switch 56. Timer switch 56, arranged in parallel with alarm 59, commences heating up as the alarm is sounded, for example, by means of a resistance heating element located in it. As the heat intensity increases, switch points 54 ultimately open so as to de-energize relay 46. As soon as relay 46 is de-energized, armature 58 opens and alarm 59 terminates its operation.

Where, for example, the operator C has been provided with a key unique to a selected one of switches 27–29, then his key is employed to transfer switch 29 to its dotted position as shown in the drawing. Alarm relay 31 is thereby de-energized. Thereafter, operation of copier 10, by means of the start button 11, applies the momentary machine cycle impulse 14 to lead 13 in a manner whereby the C register 68 will receive impulse 14 and advance it one increment, thereby recording one cycle of operation of machine 10. Impulse 14 is therefore sensed via line 13 by storage register 68, through switch 29, and line 37 returning to common line 19.

At the same time, a lighting circuit is illuminated whereby a sign is turned on to advise the operator to remove his key when he is through operating the machine, otherwise the next operator may choose to operate the machine to the account of the former. The lighting circuit is traced from power lead 32 through the now closed contact points 69 of the double armature 35 associated with alarm relay 31. Armature is urged upwardly by a spring when relay 31 is de-energized. From armature 35, the lighting circuit is further traced via lead 71 to a sign 72 containing a suitable light therein and thence to common return via lines 73, 43, and 37.

In the event that meter 41 should indicate that unauthorized usage of machine 10 has become excessive, notwithstanding the psychological deterrent afforded by alarm 59, then means selectively operable to interrupt power to machine 10 responsive to a momentary machine cycle impulse have been provided.

Accordingly, a manually settable switch 74 is connected in parallel with alarm 59 to control relay 24. Relay 24, when energized, serves to open the power interruptor contacts 22, 23 to remove power from photocopier 10 for a predetermined period corresponding to the period of sounding of alarm 59. Preferably, such interruption of power in mid-cycle of the operation of machine 10 harmlessly but effectively disrupts the desired operation sought by the unauthorized user.

From the foregoing, it will be readily apparent that there has been provided a highly useful accounting control system for monitoring the individual usage of a machine by a number of authorized operators. The system serves to maintain a tally of any unauthorized usage so monitored. Authorized usage is encouraged since the system employs a psychlological deterrent to unauthorized usage, in the form of an audible alarm which serves to announce the occurrence of unauthorized usage of the machine. Further, when unauthorized usage of the machine as indicated by the tally thereof, becomes excessive, further measures can be taken. The system can be selectively set to control the power to the machine to the extent of opening the power supply in mid-cycle for a predetermined period.

It will be further evident that the control system for monitoring machine usage is readily installed and requires no modification of the existing equipment whatsoever other than to operatively couple a lead to sense a momentary machine cycle impulse of the utilization means being monitored.

What is claimed is:

1. An accounting control system adapted to record the individual usage by a number of users of utilization means of a type generating a pulse for each cycle of operation thereof and to inhibit unauthorized usage of the utilization means, said control system comprising alarm means normally coupled to be adapted to sense said pulse and emit an alarm signal of predetermined duration indicative of unauthorized usage of the utilization means, a bank of switches lockable by keys unique to each, each switch being movable between locked and unlocked states by its associated key, counting registers operatively associated with respective ones of each of said switches, said switches being operatively coupled to said alarm means and said registers, so as to serve, when unlocked, to disable the alarm circuit means and feed said pulse to the register associated with the unlocked switch for recording each occurrence of a cycle of operation of the utilization means.

2. A system according to claim 1 wherein said alarm means produces a prolonged audible alarm signal of predetermined duration while permitting said utilization means to continue to operate without interruption, thereby serving as a psychological deterrent to unauthorized usage.

3. A control system as defined in claim 1 further including a counting register operatively coupled to said alarm means to respond to each operation of the alarm to count the number of times the alarm is activated, thereby indicating the extent of unauthorized usage of the utilization means.

4. A control system according to claim 1 further including means adapted to be operatively responsive to said pulse to interrupt the main power to said utilization means for a predetermined period to defeat unauthorized usage thereof.

5. A system adapted to monitor usage of utilization means of a type which generates a pulse indicative of each cycle of operation thereof, said system being adapted to record the individual usage of the last named means by a number of users, said system comprising alarm means adapted to normally sense said pulse and activate an alarm for a predetermined duration indicative of unauthorized usage of the utilization means, a bank of switches lockable by removable keys unique to each, each switch being movable between locked and unlocked states by its associated key, counting registers operatively associated with respective ones of each of said switches, each of said switches being operatively coupled to said alarm means and said registers so that when unlocked each switch serves to preclude activation of the alarm and feeds said pulse to the register associated with the unlocked switch for recording therein each occurrence of a cycle of operation of the utilization means, and when all switches are locked to permit said alarm means to be activated.

6. As a self-contained unit adapted to be interposed between a source of power and utilization means of a type which generates a pulse indicative of each cycle of operation thereof, an accounting control system adapted to record the individual usage of the last named means by a number of users, said control system comprising alarm means adapted to normally sense said pulse and activate an alarm for a predetermined duration indicative of unauthorized usage of the utilization means, a bank of switches lockable by removable keys unique to each, each switch being movable between locked and unlocked states by its associated key, counting registers operatively associated with respective ones of each of said switches, each of said switches being operatively coupled to said alarm means and said registers so that when unlocked each switch serves to preclude activation of the alarm and feeds said pulse to the register associated with the unlocked switch for recording therein each occurrence of a cycle of operation of the utilization means, and when all switches are locked to permit said alarm means to be activated, power leads carried by said unit, one end of said leads being adapted to cooperate with a utility outlet to take electrical power therefrom and the other end of said leads being adapted to cooperate with a utility connector plug of the utilization means to deliver power thereto, switch means in said leads for interrupting power supplied via same to said utilization means, said switch means being adapted to sense said pulse and operatively responsive thereto to interrupt power supplied via said leads.

7. A system according to claim 6 further including a register for metering unauthorized usage of said utilization means, the last named register being operatively coupled to the first named switches to respond to said pulse only when all of the first named switches are in their locked state and to store a count of the number of said pulses received, and manually settable means for selectively enabling and disabling said switch means for interrupting power to the utilization means whereby interruption of power to the utilization means can be selectively employed as a measure whenever the registered unauthorized usage exceeds selected level.

8. A system adapted to monitor usage of utilization means of a type which generates a pulse indicative of each cycle of operation thereof, said system being adapted to record the individual usage of the last named means by a number of users, said system comprising counting means adapted normally to sense said pulse and register a count for same indicative of unauthorized usage of the utilization means, a bank of switches lockable by removable keys unique to each, each switch being movable between locked and unlocked states by its associated key, counting registers operatively associated with respective ones of each of said switches, each of said switches being operatively coupled to said counting means and said registers so that when unlocked each switch serves to preclude advance of said counting means and feeds said pulse to the register associated with the unlocked switch for recording a count therein for each occurrence of a cycle of operation of the utilization means, and when all switches are locked, feeds said pulse to said counting means first named to record unauthorized usage.

No references cited.

JOHN W. CALDWELL, *Primary Examiner.*

D. L. TRAFTON, *Assistant Examiner.*